United States Patent
Bärnthaler et al.

(10) Patent No.: US 11,765,990 B2
(45) Date of Patent: Sep. 26, 2023

(54) SOIL-WORKING DEVICE FOR THE AGRICULTURAL PREPARATION OF EARTH

(71) Applicant: BOEHLERIT GmbH & Co.KG., Kapfenberg (AT)

(72) Inventors: Walter Bärnthaler, St. Marein im Mürztal (AT); Hannes Burböck, Kindberg/Aumühl (AT)

(73) Assignee: BOEHLERIT GMBH & CO.KG., Kapfenberg (AT)

( * ) Notice: Subject to any disclaimer, the term of this patent is extended or adjusted under 35 U.S.C. 154(b) by 160 days.

(21) Appl. No.: 17/084,817

(22) Filed: Oct. 30, 2020

(65) Prior Publication Data
US 2021/0185872 A1    Jun. 24, 2021

(30) Foreign Application Priority Data
Dec. 19, 2019   (AT) .............................. A 51141/2019

(51) Int. Cl.
A01B 15/04    (2006.01)

(52) U.S. Cl.
CPC .................................. A01B 15/04 (2013.01)

(58) Field of Classification Search
CPC .......... A01B 15/04; A01B 15/06; A01B 35/26
See application file for complete search history.

(56) References Cited

U.S. PATENT DOCUMENTS

| | | | | |
|---|---|---|---|---|
| 5,119,888 A * | 6/1992 | Hall | ..................... | A01B 15/025 |
| | | | | 172/699 |
| 5,172,770 A * | 12/1992 | Moyle | ..................... | A01B 15/04 |
| | | | | 172/732 |
| 6,315,058 B1 | 11/2001 | Birkenbach et al. | | |
| 9,854,721 B2 * | 1/2018 | Smeets | ................... | A01B 15/10 |
| 2019/0230838 A1 * | 8/2019 | Baernthaler | ......... | A01B 35/225 |
| 2020/0370150 A1 * | 11/2020 | Traxler | .................. | C22C 29/067 |
| 2021/0000003 A1 * | 1/2021 | Burböck | ................ | A01B 15/04 |
| 2021/0007263 A1 | 1/2021 | Bärnthaler et al. | | |

FOREIGN PATENT DOCUMENTS

| | | |
|---|---|---|
| AT | 521792 A4 | 7/2020 |
| DE | 470343 | 1/1929 |
| DE | 538035 | 11/1931 |
| DE | 3434756 | 4/1986 |
| DE | 202018000434 | 3/2018 |
| EP | 1397949 | 3/2004 |

OTHER PUBLICATIONS

Austria Search Report conducted in counterpart Austria Appln. No. A51141/2019 (dated Aug. 14, 2020).

* cited by examiner

*Primary Examiner* — Gary S Hartmann

(74) *Attorney, Agent, or Firm* — GREENBLUM & BERNSTEIN, P.L.C.

(57) ABSTRACT

A soil-working device for the agricultural preparation of earth, in particular for the planar cutting of earth, including a main body and cutting elements arranged on the latter, the main body having a carrier face and a sliding face, cutting elements being arranged on the carrier face, and earth being able to slide off over the sliding face. To avoid smearing over a soil when working same, the sliding face adjoins the carrier face at an angle so that the distance of the sliding face from the earth increases away from the carrier face.

16 Claims, 3 Drawing Sheets

SOIL-WORKING DEVICE FOR THE AGRICULTURAL PREPARATION OF EARTH

CROSS-REFERENCE TO RELATED APPLICATIONS

The present application claims priority under 35 U.S.C. § 119(a) of Austria Patent Application No. A 51141/2019 filed Dec. 19, 2019, the disclosure of which is expressly incorporated by reference herein in its entirety.

The invention relates to a soil-working device for the agricultural preparation of earth, in particular for the planar cutting of earth, comprising a main body and cutting elements arranged on the latter, the main body having a carrier face and a sliding face, cutting elements being arranged on the carrier face, and earth being able slide off over the sliding face.

The preparation of earth plays an important role in agriculture to achieve a high level of crop scattering and productivity. Good preparation of earth before new seed is scattered can be critical for achieving the desired harvest result. Accordingly, value has also recently been placed on developing appropriate soil-working devices for good preparation of the earth before sowing.

For the agricultural preparation of earth, it is generally necessary to cut through it with a planar cut, and a top layer of the earth, generally to a depth of approximately 2 to 15 cm, should be cut through as smoothly as possible. As a result, any roots, in particular those of weeds, remaining in the earth are severed, and at the same time the earth is loosened somewhat. For corresponding cutting, duckfoot shares which are fastened to a tractor and towed by the latter are particularly suitable.

In conjunction with duckfoot shares but also other agricultural soil-working devices, it has become known to increase the service life of corresponding devices by arranging hard metal inserts as cutting elements in the active cutting regions. These cutting elements are disadvantageous at first glance in terms of their economic benefit, since hard metal is much more expensive than steel, which is usually used for such devices, and also the production and subsequent fastening of the cutting elements to a steel main body requires multiple steps. However, these costs are compensated and result in a better cost-benefit ratio overall thanks to a much increased service life.

It is also known for duckfoot shares or similar soil-working devices for preparing earth, to adapt main bodies which would already be fit for use by themselves such that they are equipped with hard metal cutting elements. In the context of the present invention, however, it was found that even corresponding soil-working devices still have considerable potential for improvement, since the working results are still unsatisfactory despite a smooth cut. It has been found, inter alia, that there is a tendency for a smeared layer to form during planar cutting, owing to a soil-working device bearing against the lower part of the cut-through earth. Such a smeared layer means that the lower part of the cut-through earth is, in a manner of speaking, sealed off, which is disadvantageous in two respects: Firstly, a continuous supply of groundwater for plants is inhibited from below. Secondly, rainwater is prevented from seeping away, which is likewise disadvantageous.

The problem addressed by the invention is that of developing a soil-working device of the type mentioned in the introduction such that the aforementioned disadvantages of the formation of a smeared layer when earth is cut through are avoided or at least reduced.

This problem is solved when, in a soil-working device of the type mentioned in the introduction, the sliding face adjoins a carrier face at an angle so that the distance of the sliding face from the earth increases away from the carrier face.

The invention is based on the following considerations:

A duckfoot share or a similar soil-working device has a stem-like extension with which the soil-working device can be fastened to a tractor or another towing machine. To this end, a fastening hole is generally provided in the working device. Although the fastening is rigid, it cannot be entirely avoided that the main body is deflected by a few degrees, in particular under the force loading present when cutting and cutting through earth. As a result, it is possible that, despite any presettings made, the main body tilts such that it bears against the lower part of the cut-through earth and thereby forms a smeared film after the earth has been cut through in the desired manner. However, this is avoided with the concept according to the invention. Even if an angle error occurs, there is always sufficient free space towards the earth, specifically the lower part of the cut-through earth, and therefore no smeared layer is formed. This is achieved in that the sliding face adjoins the carrier face at a suitable angle so that the distance of the sliding face from the earth increases. In other words, the sliding face does not run parallel to the earth or the lower part of the cut-through earth but is inclined upwards, at least in the region where it adjoins the carrier face. The said free space is formed thereby, which also means that there is less friction when earth is cut through in a planar manner, because the main body or the sliding face thereof bears against the earth less.

A further advantage is that the main body wears less thanks to the spacing from the lower part of the cut-through earth. In the regions in which there is a lot of wear, hard metal fittings or cutting elements consisting of hard metal are provided in any case. Therefore, the regions subject to the most wear are equipped with particularly wear-resistant material, but the other regions are optimised in that wear is reduced in comparison with the prior art. As a result, the main body or the sliding face can also be produced with less material, which means a saving on material. This leads to the further, theoretical consideration that the soil-working device could then be less stable, but this is not the case, since the tilting of the sliding face against the carrier face results in additional reinforcement, which has a positive effect on the stability of the soil-working device during operation or use.

It can be provided for the distance to increase at least in the region in which the sliding face adjoins the carrier face. Precisely in this region or these regions, it can be important for there to be a corresponding spacing of the sliding face from a lower part of the cut-through earth. The upper part of the cut-through earth can slide off the top of the sliding face, as is expedient. Despite this pressure on the sliding face, however, it does not then hear against the lower part of the cut-through earth in the region of the carrier face or the joining therewith.

For the reasons explained, it is particularly preferable for the distance to increase from a joining between the sliding face and the carrier face to an opposite end of the sliding face. In practice, the sliding face ends in a stem-like extension via which fastening to a towing machine is possible or merges into such a stem-like extension indirectly via further regions of the main body. Since the pressure on the sliding face can increase towards the stem-like extension owing to the sliding off of the earth, an increase of the distance in this direction can advantageously be provided. This increase can be formed continuously, for example. In this connection, continuously means that the distance of the sliding face in the stated direction always increases from the carrier face towards the stem-like extension, but the increase in relation to a length in the direction from the carrier face to the stem-like extension can vary, that is, the change in the distance over a unit of length does not have to be constant.

Alternatively, it is also possible, however, for a distance of the sliding face from the lower part of the cut-through earth to increase initially but then be constant. Further designs are also possible, in which regions can also be provided in which the distance increases and then decreases again or, in a further alternative, is constant in sections and then increases again.

It is further preferable for the sliding face to adjoin the carrier face, at least in some regions, at an angle of at least 135°, preferably at least 140°, in particular at least 142.5°. The desired clearance from the earth can be achieved by corresponding positioning of the sliding face. The greater the angle, the better the clearance. Angles of 145°, 147.5°, 150°, 152.5°, 155°, 157.5°, 160°, 162.5° or 165° can also be provided. Even larger angles are possible, for example in further increments of in each case 2.5° beginning from 165°. However, the greater this positioning angle, the greater the force applied when earth is cut through. In this respect, an angle range between approximately 135° and approximately 160° can be regarded as optimal.

The above angles relate to an angle between the carrier face and the sliding face; the carrier face and thus the cutting elements are positioned relative to the earth or soil at approximately 15° to 45°, for example 25° to 35°. The clearance or elevation of the sliding face relative to the soil can also be expressed using an angle which is formed between the sliding face and the soil, if the sliding face is theoretically extended at the joining with the carrier face. The resulting acute angle is approximately 5° to 25°, preferably 7.5° to 15°, in particular 10° to 12.5°.

It can be provided for the carrier face to be bent at least in some sections. One or more cutting elements are fastened to the carrier face. A transition to the sliding face can take place via one or more radii. In particular, a sequence of bent sections can also be provided. In this case, the bent sections can adjoin one another with different radii. However, it is also possible for bent sections to be connected by flat regions. In this case, the bent sections can also be formed with the same radius, but this is not mandatory.

As mentioned, one or more cutting elements are arranged on the end of the carrier face. The cutting elements provide the desired cutting effect when earth is cut through. In principle, the cutting elements can have any desired shape. Cutting elements designed according to Austrian patent application A 50553/2019, in particular as follows, have proven particularly expedient:

The cutting element consisting of hard metal has a top and a bottom and an end face, a rear face opposite the end face, and at least one side face, the top and the bottom being connected via the end face, the rear face and the at least one side face, and the end face having a cutting region with multiple teeth, at least one tooth being formed with a first flank and a second flank, a profile line of the first flank and a profile line of the second flank having different lengths.

For the cutting element, it can be provided for the first flank of the at least one tooth to be arranged after the second flank of the at least one tooth, in a working direction.

It can also be provided for the second flank to form an angle of 0° to 60°, preferably 2° to 45°, in particular 5° to 15°, with an imaginary plane parallel to the end face, when viewed from above.

Furthermore, it can be provided for the second flank of the at least one tooth to be arranged at an angle of 60° to 120°, preferably 70° to 110°, in particular 90°, to the first flank of a subsequent tooth.

It can also be provided for the profile line of the second flank of the tooth to be more than 1.1 times, at least twice, in particular five times as long as the profile line of the first flank of the at least one tooth.

It can also be provided for the cutting region to have two to ten, preferably three to five, in particular four teeth.

It can be provided for the length of the cutting element to be at least as long, preferably twice as long, in particular three times as long, as the width of the cutting element.

It can be provided for the length of the cutting element to be at least as long, preferably five times as long, in particular twenty times as long, as the height of the cutting element.

The main body is preferably formed from steel. The main body can be created as desired but is preferably created by forging. If plate seats are provided for individual cutting elements, the plate seats can be worked into the possibly forged main body by machining, in particular by milling. In this case, it can be provided for individual plate seats to be designed such that the cutting elements do not touch each other, but the positioning of the plate seats to be selected such that the cutting elements still form a common, continuous cutting edge by an arrangement offset in the cutting direction. To this end, it can be provided for the main body to be designed with a conical shape, in particular a V shape, in the cutting direction, or at least for the soil-working device to have an oblique profile in the cutting direction.

The cutting elements can be formed from a hard metal, although in principle a highly wear-resistant steel which is much more wear-resistant than the main body is also suitable. However, hard metal is used by preference, since this is particularly wear-resistant. Various types of hard metal are used. However, it has been found that hard metal types having approximately 80 weight percent (below: wt %) to 95 wt % and a binder metal, preferably iron, nickel and/or cobalt, together in an amount of 5 wt % to 15 wt %, preferably 7 wt % to 13 wt %, in particular 8 wt % to 12 wt %, are expedient. It is particularly preferred if the binder metal is present in substantially cobalt-free form, that is, is formed with only iron and, where necessary, nickel. Tungsten carbide can be present with an average grain size in the range of approximately 1.5 μm to 5 μm, in particular 2.0 μm to 3.0 μm. Corresponding hard metal types have been found to be suitable for cutting work in the agricultural field. It can also be provided for the insert to be coated. Coatings by means of CVD or PVD processes are considered for this. The coatings can be coatings of the $Al_{1-x}Ti_xN$ type, for example. Corresponding coatings can have a layer thickness of up to 15 μm, for example. Coatings having alternating coating layers of different compositions are also possible.

A soil-working device according to the invention is advantageously designed as a share, in particular a duckfoot share. However, the concept according to the invention can also be used in all other soil-working devices having cutting elements, where it is a matter of cutting through earth as efficiently as possible while preventing formation of a smeared layer as far as possible.

Further features, advantages and effects of the invention can be found in the exemplary embodiment presented below. In the drawings to which reference is made:

Figure 2:
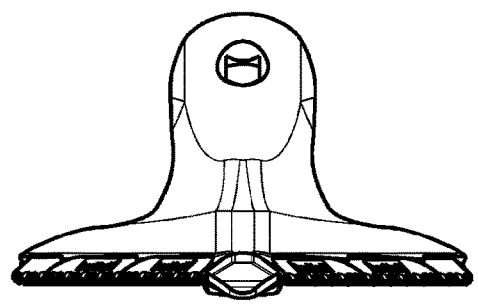
FIG. 2 shows a view from the end of the soil-working device according to FIG. 1.
Figures 1, 4, 5:
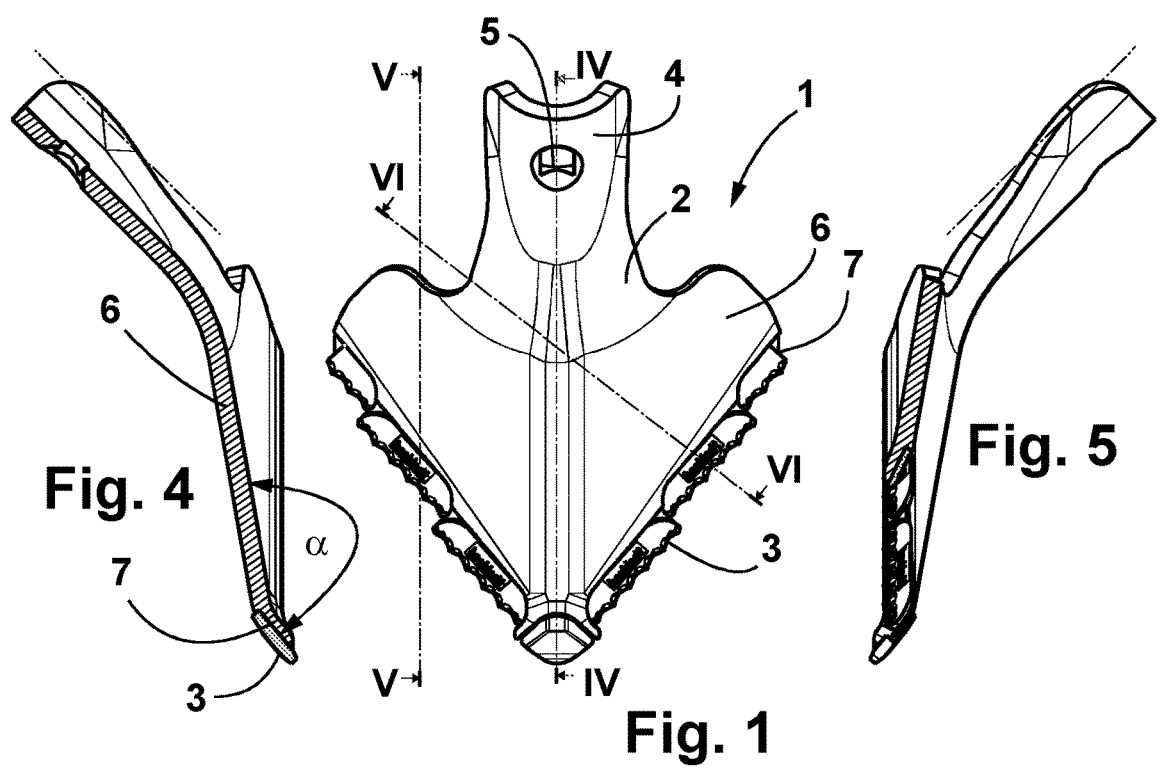
FIG. 1 shows a view from above of a soil-working device.
FIG. 4 shows a section along line IV-IV in FIG. 1.
FIG. 5 shows a section along line V-V in FIG. 1.
Figures 3, 6:
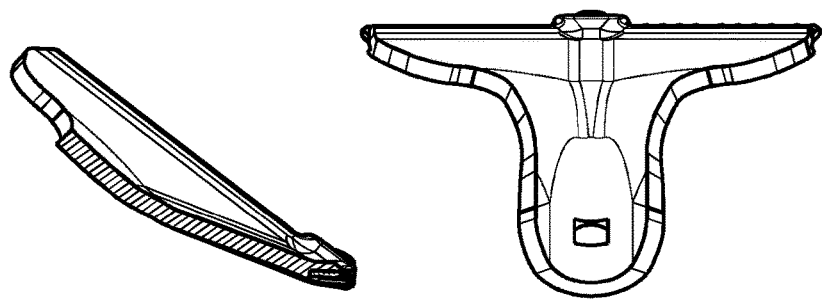
FIG. 3 shows a lower view of the soil-working device according to FIG. 1.
FIG. 6 shows a section along line VI-VI in FIG. 1.

A soil-working device 1 according to the invention is shown in FIG. 1. FIG. 2 shows an end view and FIG. 3 shows a lower view of the same soil-working device 1. FIG. 4 to FIG. 6 show sections of the soil-working device 1 along lines IV-IV (FIG. 4), V-V (FIG. 5) and VI-VI (FIG. 6).

As can be seen in particular in FIG. 1 and FIG. 2, the soil-working device 1, which is in the form of a duckfoot share, has an approximately V-shaped main body 2 as viewed from above. Although the main body is V-shaped in the exemplary embodiment, the main body can in principle also assume other shapes, but is preferably designed so as to produce a tip pointing in the cutting direction when viewed from above. In the present exemplary embodiment, this is the V shape which points in the cutting direction.

The main body 2 of the soil-working device 1 comprises multiple regions. The main body 2 is provided in the centre with a sliding face 6, which merges at the rear into a stem-like extension 4. This stem-like extension 4 is used to fasten the soil-working device 1 to a corresponding holder of a towing machine such as a tractor. To this end, the stem-like extension 4 is formed with a fastening hole 5. However, multiple fastening holes can also be provided, like in other variants of a soil-working device 1 according to the invention. It is also possible for another fastening mechanism to be provided to hold a fastening means instead of a fastening hole 5, for example fixing by releasable clamping.

In the end region, the sliding face 6 adjoins a carrier face 7 bearing cutting elements 3. A plurality of cutting elements 3 is provided. The cutting elements 3 are formed from a more wear-resistant material than the main body 2. To this end, the cutting elements 3 can in particular be formed from a hard metal. The cutting elements 3 can also be provided with a coating to increase the wear resistance.

As can be seen in particular in FIG. 4, the sliding face 6 merges into the carrier face 7 so as to produce, in cross-section, a distance—or elevation—which increases towards the stem-like extension 4 from a soil or from a lower part of cut-through earth. This is achieved in that the profile of the sliding face 6, as can be seen in particular in the cross-section according to FIG. 4, is tilted upwards theoretically and also practically. This elevation of the sliding face 6 or a greater tilting, for example at an angle α of approximately 135° to 160°, such angle being shown in FIG. 4 between respective undersurfaces of the sliding face 6 and the carrier face 7 in the adjoining region, results in a corresponding clearance downwards. If an upper layer of earth is then separated, for which reason the soil-working device 1 is designed as a duckfoot share, the soil-working device 1 slides over the lower layer without the sliding face 6 touching this lower, remaining earth layer. This prevents the sliding face 6 dragging along the earth layer which has not been separated by bearing against same and thereby forming an undesirable smeared layer. The cutting elements 3 themselves are positioned approximately at an angle of 25° to 40°, preferably approximately 27.5° to 35°, so that earth can be cut into or through in the usual manner. Like in the prior art, separated earth slides along the sliding face 6, which, in contrast to the prior art, no longer slides along the lower part of the earth.

Figure 7:
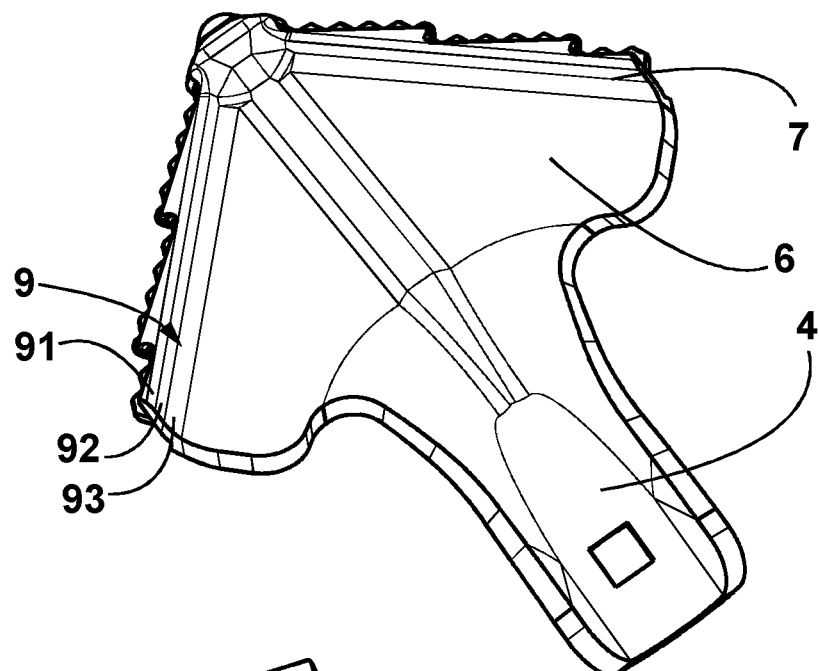
FIG. 7 shows a perspective diagram of the soil-working device according to FIG. 1.
Figure 8:
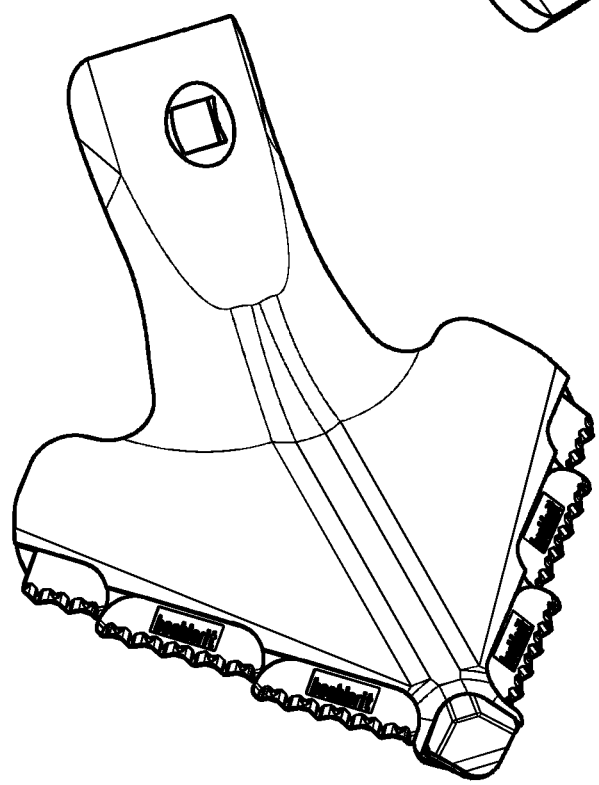
FIG. 8 shows a further perspective diagram of the soil-working device according to FIG. 1.

FIG. 7 and FIG. 8 show perspective diagrams of the soil-working device 1. It can be seen in particular in FIG. 7 that the carrier face 7 has multiple sections 9. In the exemplary embodiment, a variant can be seen in which the sections 91, 93 are bent, with different radii. A flat section 92 is provided between the two bent sections 91, 93. Other designs are also possible. For example, all the sections 9 can be bent. A suitable design depends on the expected forces and the transfer thereof in the interaction between the carrier face 7 and the sliding face 6.

Figure 9:
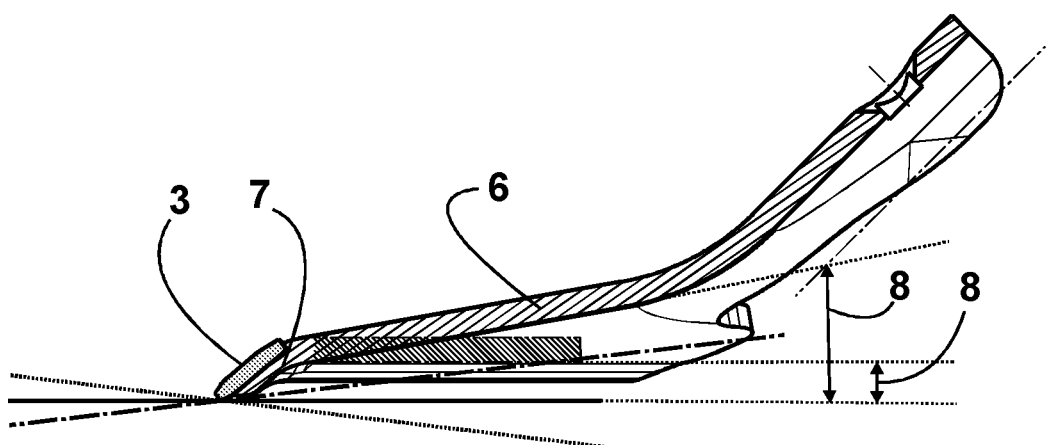
FIG. 9 shows a cross-section through a soil-working device according to FIG. 1 along line IV-IV in comparison with the prior art.

The differences from the prior art are particularly apparent in FIG. 9. Like FIG. 4, FIG. 9 shows a section along line IV-IV. A further crosshatched region is shown, which indicates a profile of the sliding face 6 according to the prior art. As can be seen, the sliding face 6 in this case runs substantially parallel to the soil at a distance 8. The cutting elements 3 are also fastened at the same angle according to the prior art, so that fundamentally similar cutting conditions result. However, the prior art does not take into account possible tilting of the main body 2, which is produced automatically as a result of the fastening to a towing means. Even if this has perfect positioning initially, a certain amount of play can occur over time in use as a result of fastening means loosening, so that the main body 2 ultimately deflects slightly, which can already be sufficient for the sliding face 6 according to the prior art to bear against a lower part of the earth when earth is cut through and thus cause the undesirable smearing effect. However, if a solution according to FIG. 9 is made, a much larger clearance is produced, as can be seen, as a result of which the problem of the smearing effect can be overcome in the long term.

FIGS. 1 to 9 show the soil-working device 1 in the form of a duckfoot share. It is self-evident that the corresponding features can readily be transferred to analogous soil-working devices 1 without affecting the concept of the invention. It is also self-evident that the aforementioned specific features associated with the exemplary embodiment can also be applied entirely generally and separately from further features of the exemplary embodiment.

The invention claimed is:

1. A soil-working device for agricultural preparation of earth, including planar cutting of earth, said soil-working device comprising:
   a main body; and
   cutting elements arranged on the main body;
   the main body having a sliding face and a carrier face, the sliding face and the carrier face are adjoined at an adjoining region;
   the cutting elements being arranged on the carrier face, and earth being able to slide off over the sliding face;
   in the adjoining region, the sliding face and the carrier face are adjoined at an angle (α) configured so that a distance of the sliding face from the earth is increased in a direction away from the carrier face; and
   the angle (α) being defined by respective undersurfaces of the sliding face and the carrier face in the adjoining region.

2. The soil-working device according to claim 1, wherein:
   the distance increases at least in the adjoining region at which the sliding face adjoins the carrier face.

3. The soil-working device according to claim 1, wherein:
the distance increases from a joining between the sliding face and the carrier face to an opposite end of the sliding face.

4. The soil-working device according to claim 3, wherein: the distance increases continuously.

5. The soil-working device according to claim 1, wherein: the sliding face adjoins the carrier face, at least in some regions, at an angle of at least 135°.

6. The soil-working device according to claim 1, wherein: the sliding face adjoins the carrier face, at least in less than all regions, at an angle of at least 140°.

7. The soil-working device according to claim 1, wherein: the sliding face adjoins the carrier face, at least in some regions, at an angle of at least 142.5°.

8. The soil-working device according to claim 1, wherein: the carrier face is bent at least in a plurality of sections of the carrier face.

9. The soil-working device according to claim 6, wherein: the carrier face is formed with multiple bent sections.

10. The soil-working device according to claim 1, wherein:
one or more cutting elements are arranged on an end of the carrier face.

11. The soil-working device according to claim 1, wherein:
the main body is formed from steel.

12. The soil-working device according to claim 1, wherein:
the soil-working device is a duckfoot share.

13. The soil-working device according to claim 1, wherein:
the angle ($\alpha$) is less than 180°.

14. The soil-working device according to claim 1, wherein:
the angle ($\alpha$) is no greater than 165°.

15. The soil-working device according to claim 1, wherein:
the angle ($\alpha$) has a range between 135° and 160°.

16. The soil-working device according to claim 1, wherein:
in the adjoining region, the sliding face and the carrier face are adjoined at an angle ($\alpha$) configured so that, in cross-section, an elevation of the sliding face from the earth is increased at least in a longitudinal direction extending away from the carrier face.

* * * * *